March 24, 1931.  R. B. BAGBY  1,797,312
HEATER FOR PREHEATING MILK
Filed March 22, 1929  2 Sheets-Sheet 1
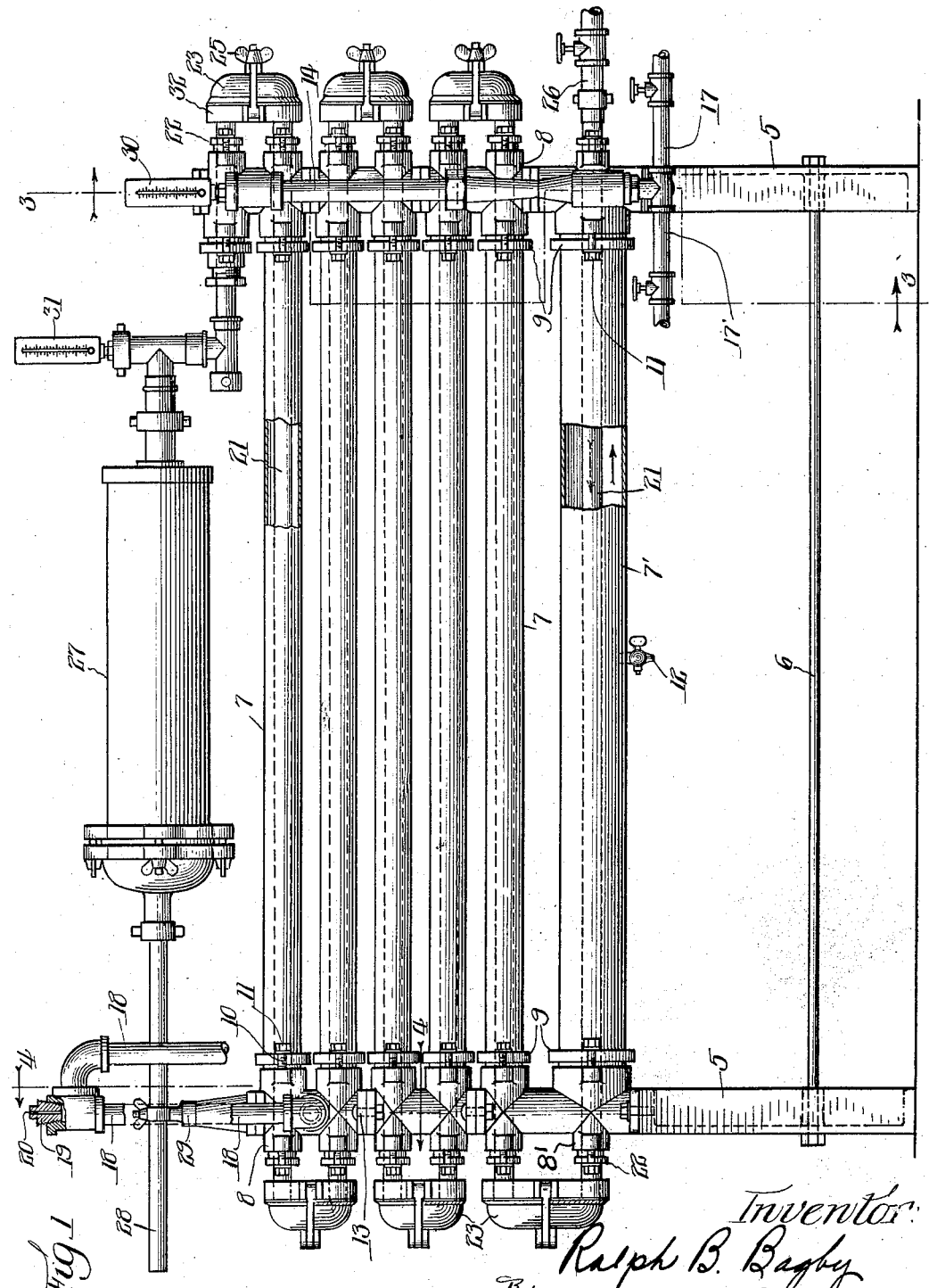

March 24, 1931. R. B. BAGBY 1,797,312
HEATER FOR PREHEATING MILK
Filed March 22, 1929 2 Sheets-Sheet 2
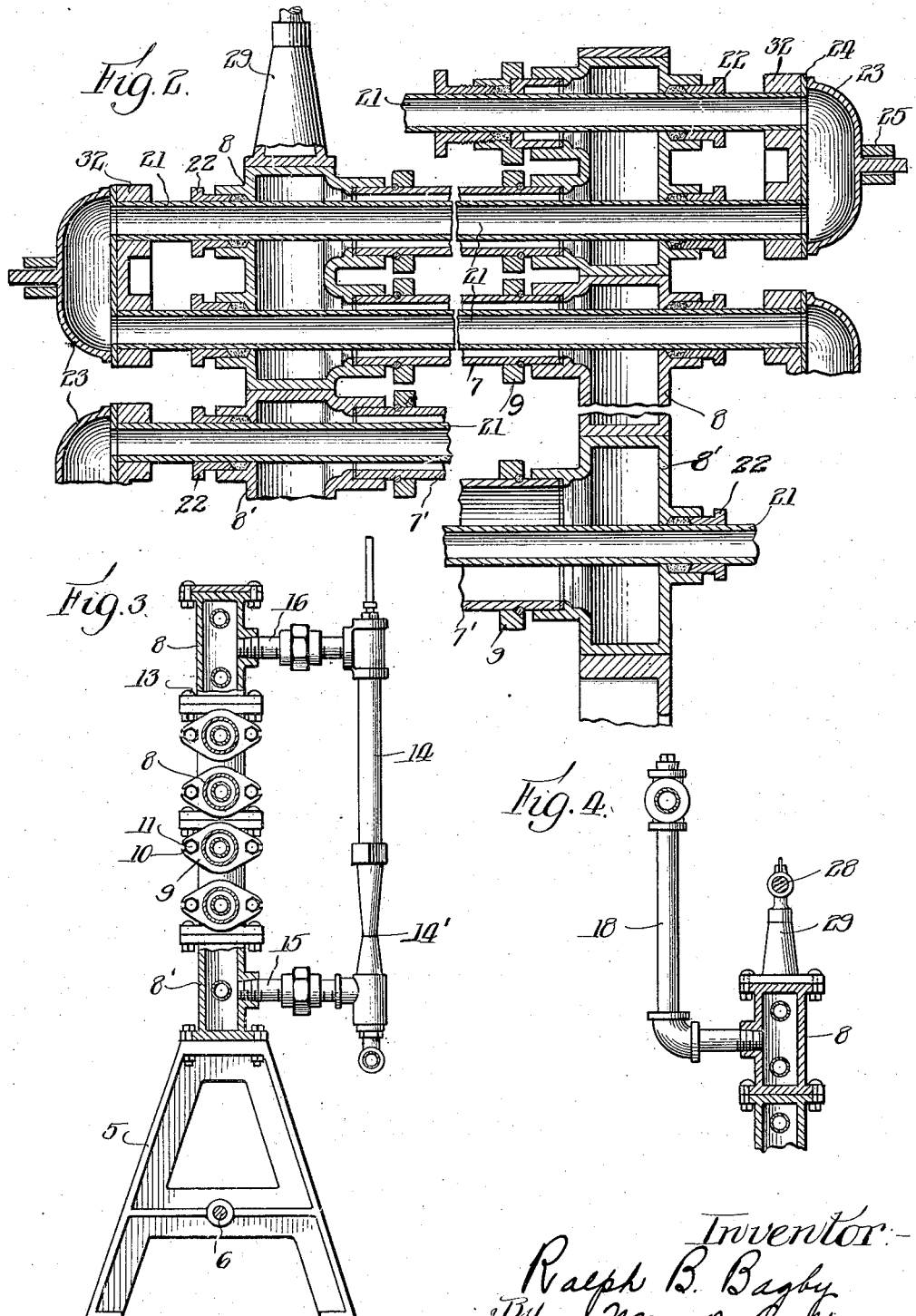

Patented Mar. 24, 1931

1,797,312

UNITED STATES PATENT OFFICE

RALPH B. BAGBY, OF CHICAGO, ILLINOIS

HEATER FOR PREHEATING MILK

Application filed March 22, 1929. Serial No. 349,024.

This invention relates to heaters which can be advantageously used for pre-heating milk for filtering or for separating.

One of the objects of the invention is to provide a heater of simple construction which can be operated economically for heating milk while it is moving through a coil and without involving manual handling of the milk.

A further object of the invention is to provide a heater for pre-heating milk comprising a milk pipe coil enclosed within a water pipe coil, the circulation of the milk and the water being maintained in opposite directions to secure the maximum degree of heat transfer.

And a further object of the invention is to utilize steam for heating and maintaining a circulation of hot water in a tube enclosing another tube through which a flow of milk is induced and controlling the steam inlet and the milk flow to deliver the milk at a predetermined temperature.

And a still further object of the invention is to provide a coil for heating milk wherein the milk tube is enclosed within a larger tube through which a flow of hot water is maintained in a direction opposite to the flow of milk and delivering the heated milk directly into a filter connected with the milk pipe to provide a self-contained pre-heater and filter for filtering or clarifying milk.

In the accompanying drawings I have illustrated a selected embodiment of the invention in which Fig. 1 is a side elevation, partly broken away and in section;

Fig. 2 is an enlarged detail sectional view of parts of the heater;

Fig. 3 is a vertical sectional view on the line 3—3 of Fig. 1; and

Fig. 4 is a detail sectional view on the line 4—4 of Fig. 1.

Referring to the drawings, the invention comprises a suitable base which may conveniently consist of the standards 5—5 connected by a tie rod 6. In the embodiment shown, the water coil comprises a plurality of straight pipes 7 arranged in parallel relation one above the other and secured at their ends in headers 8 by bolts passed through flanges 9 fixed on or unitary with the pipes to make water tight joints. I prefer to provide these flanges with slotted ears 10 to receive the bolts 11 by which the pipes are tightly secured in the headers. The lower pipe 7' is larger than the other pipes to form a water reservoir, and this pipe is provided with a cock 12 for draining the water coil. The headers 8 at each end of the coil are arranged one upon the other and fastened together by bolts 13 and they form, in effect, a header at each end of the water coil made up of independent sections bolted together, each section receiving the ends of two pipes and forming a connection therebetween. To maintain a circulation of water through the coil, I provide a suction lift at one end of the coil to lift the water from the bottom coil to the top coil, and this suction lift comprises a pipe 14 which is connected by a pipe 15 with the header 8' for the bottom pipe 7' and by a pipe 16 with the header for the top pipe. The suction lift pipe 14 is contracted at 14' and is provided with a valved steam inlet pipe 17 and a valved water inlet pipe 17' at its lower end. In the normal operation of the heater the steam jet will induce a flow of water up from the bottom pipe 7' through the pipe 14 to the top pipe 7 by creating a suction lift which will maintain a constant circulation of the water. A bent overflow pipe 18 is connected with the top header section at the end of the coil opposite the suction lift pipe. A plug 19 having an opening 20 therein is arranged at the top of the overflow pipe to provide a conveniently located air vent for the water coil. A milk pipe 21 is arranged in each of the water pipes 7 and projects through the header sections at the ends of said water pipes and is secured water tight by packing glands 22. The milk pipes are connected at their ends in pairs by bends 23 seating against interposed gaskets 24 and secured in place by screw clamps 25. The milk pipes are centrally disposed within the water pipes and the lower milk pipe has a valved inlet connection 26. The top milk pipe connects with a filter 27 which may be supported conveniently above the coils by the top milk pipe and by a rod 28 engaged with a bracket 29 on one of the headers. A thermometer 30 is mounted on the top of the suction lift pipe 14 and another thermometer 31 is located at the inlet to the filter.

In practice the water supply valve is opened and the water coil is filled with water until it overflows at the overflow pipe 18, whereupon the water supply valve is closed. Then the steam valve is opened gradually, very little steam being required, and it induces a circulation of water through the pipes of the water coil and a suction lift in the pipe 14 to maintain this circulation. Then the milk coil supply valve is opened and the milk flows through the pipes of the milk coil in a reverse direction to the flow of water through the water coil whereby the maximum degree of heat transfer from the water to the milk is obtained. By observing the milk thermometer 31 and the water thermometer 30 and regulating the milk flow and the steam supply the milk may be maintained at a desired temperature such as 90° F. which is considered desirable for filtering or clarifying purposes. It will be apparent that a higher or lower temperature may be maintained for any purposes desired by properly controlling the milk and steam supplies. In practice it has been found that with the milk supply at 50° F. and with a steam pressure of 50 lbs. per square inch the heater will heat the milk to 90° F. at an approximate rate of 7,500 lbs. per hour. The capacity of the heater will vary with the temperature of the milk supply and the steam pressure used. After the valves have been set to obtain the desired milk temperature the heater will continue to operate automatically without further attention; it is noiseless in operation and it heats the milk to the desired temperature rapidly and efficiently. The overflow pipe is bent and vented to prevent siphoning action on the water while still affording an efficient overflow. The filter is conveniently located, as shown and described, at the top of the coils supported at one end upon the milk coil pipe and at its other end upon one of the headers, but it may be located beneath the coil or separated therefrom, as will be readily understood. The milk pipes are preferably made of sanitary tinned copper tubing rolled tightly into nickel silver headers 32 to which the clamps 25 are pivotally connected. Gaskets 24 are interposed between the headers 32 and the return bends 23 to prevent leakage. The return bends are also preferably made of nickel silver machined inside to eliminate crevices or obstructions which might prevent the free flow of milk. The water pipes are preferably made of steel held in place by cast iron headers; and all of the packing glands are preferably made of malleable iron and provided with slotted ears and fastening bolts for convenience in assembling and adjusting.

While the invention is particularly adapted for preheating milk for filtering, it can be used for many other purposes as will be readily apparent to those skilled in the art.

The construction of the heater is such that it can be easily flushed and cleaned and maintained in sanitary condition, and it can be easily taken apart for repair or replacement and reassembled without special skill.

I have shown the invention in a commercial form which I have found satisfactory in actual practice, but I reserve the right to make all such changes in the form, construction and arrangement of parts of my invention which may be necessary for different installations or otherwise desirable, within the scope of the following claims.

I claim:

1. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil and out at its other end, and means for inducing a constant circulation of the heating fluid in its coil.

2. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil, and means for inducing a circulation of the heating fluid in its coil in a reverse direction to the flow of the fluid to be heated in its coil.

3. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil and out at its other end, and a suction lift for inducing a flow of heating fluid from the bottom pipe to the top pipe and a constant circulation of the heating fluid in its coil.

4. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil, a suction lift pipe connected with one end of the bottom pipe and with the corresponding end of the top pipe of the heating fluid coil, and a steam connection for said suction lift pipe to induce a flow of the heating fluid from the bottom pipe to the top pipe of the heating fluid coil and a constant circulation of the heating fluid in its coil.

5. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil, and means for inducing a circulation of the heating fluid in its coil, the bottom pipe of said heating fluid coil being enlarged to provide a water reservoir.

6. A heater comprising a plurality of pipes arranged one above the other in parallel relation, headers connecting said pipes together in pairs at their ends to form a coil containing a heating fluid, another plurality of pipes enclosed within said heating fluid pipes and projecting through and beyond said headers, bends secured on the ends of said enclosed pipes and connecting them together in pairs to form a coil for a fluid to be heated, means for admitting the fluid to be heated at one end of its coil and inducing a flow of said fluid through said coil, and means for inducing a circulation of the heating fluid in its coil in a reverse direction to the flow of the fluid to be heated in its coil.

7. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil and out at its other end, an inlet for the heating fluid coil including opposed valve controlled branches adapted to be alternately opened whereby a fluid may be introduced into said coil when one of said branches is open and whereby said fluid may be caused to circulate by steam admitted thereinto when the other of said branches is opened.

8. A heater comprising a plurality of pipes connected together to form a coil containing a heating fluid, another plurality of pipes enclosed within said heating fluid pipes and connected together to form a coil for a fluid to be heated, means for admitting the fluid to be heated at one end of its coil and inducing a flow of said fluid through said coil and out at its other end, an inlet for the heating fluid coil including opposed valve controlled branches adapted to be alternately opened whereby a fluid may be introduced into said coil when one of said branches is open and whereby said fluid may be caused to circulate by steam admitted thereinto when the other of said branches is opened, said heating fluid coil including an overflow discharge outlet comprising a conduit having a bend therein, said conduit being vented at said bend to provide an air outlet whereby siphoning will be prevented.

RALPH B. BAGBY.